United States Patent
Cao et al.

(10) Patent No.: US 10,324,754 B2
(45) Date of Patent: Jun. 18, 2019

(54) MANAGING VIRTUAL MACHINE PATTERNS

(71) Applicant: International Business Machines Corporation, Armonk, NY (US)

(72) Inventors: Bin Cao, Rochester, MN (US); Jessica R. Eidem, Rochester, MN (US); Brian R. Muras, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 202 days.

(21) Appl. No.: 14/073,954

(22) Filed: Nov. 7, 2013

(65) Prior Publication Data
US 2015/0128131 A1    May 7, 2015

(51) Int. Cl.
*G06F 9/48* (2006.01)
*G06F 9/455* (2018.01)

(52) U.S. Cl.
CPC ........ *G06F 9/4856* (2013.01); *G06F 9/45533* (2013.01); *G06F 9/45558* (2013.01); *G06F 2009/45575* (2013.01); *G06F 2009/45579* (2013.01); *G06F 2009/45583* (2013.01); *G06F 2009/45595* (2013.01)

(58) Field of Classification Search
None
See application file for complete search history.

(56) References Cited

U.S. PATENT DOCUMENTS

| 6,249,881 B1 | 6/2001 | Porten et al. |
| 6,353,923 B1 | 3/2002 | Bogle et al. |
| 8,122,453 B2 * | 2/2012 | Trossman et al. ............ 718/104 |
| 8,745,641 B1 | 6/2014 | Coker |
| 8,924,539 B2 * | 12/2014 | Ferris .................... G06F 9/5072 709/224 |
| 2001/0005852 A1 | 6/2001 | Bogle et al. |
| 2005/0228852 A1 * | 10/2005 | Santos .................. G06F 9/5005 709/200 |

(Continued)

FOREIGN PATENT DOCUMENTS

EP        2852097 A1 *   3/2015

OTHER PUBLICATIONS

Lee, S., et al., "Validating Heuristics for Virtual Machines Consolidation", Type: TechReport, No. MSR-TR-2011-9, Jan. 1, 2011, pp. 1-14, Microsoft Research, Mountain View, CA, USA.

(Continued)

*Primary Examiner* — Lewis A Bullock, Jr.
*Assistant Examiner* — Bruce S Ashley
(74) *Attorney, Agent, or Firm* — Bryan S. Bortnick

(57) ABSTRACT

Managing virtual machine patterns, including: identifying resource utilization of each virtual machine within a first virtual machine pattern having a first group of resources; determining resource requirements of one or more applications executing on one or more virtual machines within the first virtual machine pattern; based on the resource utilization and the determined resource requirements, identifying a second virtual machine pattern having a second group of resources; and deploying at least one of the one or more applications executing on the one or more virtual machines within the first virtual machine pattern onto one or more virtual machines of the second virtual machine pattern.

17 Claims, 8 Drawing Sheets

(56) References Cited

U.S. PATENT DOCUMENTS

| | | | |
|---|---|---|---|
| 2006/0173994 A1* | 8/2006 | Emeis | G06F 9/5044 709/224 |
| 2007/0168968 A1 | 7/2007 | Bates et al. | |
| 2009/0070771 A1* | 3/2009 | Yuyitung et al. | 718/105 |
| 2009/0119396 A1* | 5/2009 | Kanda | 709/223 |
| 2009/0300605 A1* | 12/2009 | Edwards et al. | 718/1 |
| 2010/0107159 A1* | 4/2010 | Radhakrishnan et al. | 718/1 |
| 2011/0055377 A1* | 3/2011 | Dehaan | G06F 9/4856 709/224 |
| 2011/0161730 A1 | 6/2011 | Van Der Merwe et al. | |
| 2011/0173327 A1* | 7/2011 | Chen et al. | 709/226 |
| 2012/0096093 A1 | 4/2012 | Bouw | |
| 2012/0246202 A1 | 9/2012 | Surtani | |
| 2012/0272235 A1 | 10/2012 | Fahrig | |
| 2012/0324112 A1* | 12/2012 | Dow | G06F 9/5077 709/226 |
| 2012/0330700 A1 | 12/2012 | Garg et al. | |
| 2013/0013865 A1* | 1/2013 | Venkatesh | G06F 17/30132 711/133 |
| 2013/0132584 A1 | 5/2013 | Palladino | |
| 2013/0238805 A1* | 9/2013 | Catrein | G06F 9/5072 709/226 |
| 2014/0007222 A1* | 1/2014 | Qureshi | G06F 21/10 726/16 |
| 2014/0040474 A1* | 2/2014 | Blagodurov | G06F 9/5088 709/226 |
| 2014/0052867 A1 | 2/2014 | Lucovsky | |
| 2014/0075035 A1 | 3/2014 | Revanuru | |
| 2014/0123292 A1 | 5/2014 | Schmidt | |
| 2014/0282889 A1 | 9/2014 | Ishaya | |
| 2015/0007199 A1 | 1/2015 | Valeva et al. | |
| 2015/0032248 A1* | 1/2015 | Bauer | G05B 19/0428 700/159 |
| 2015/0161022 A1 | 6/2015 | Bragstad et al. | |
| 2015/0161023 A1 | 6/2015 | Bragstad et al. | |
| 2015/0195121 A1 | 7/2015 | Bragstad et al. | |
| 2015/0195143 A1 | 7/2015 | Bragstad et al. | |

OTHER PUBLICATIONS

Gong, Z., et al., "PAC: Pattern-driven Application Consolidation for Efficient Cloud Computing", In Proceedings, IEEE/ACM International Symposium on Modeling, Analysis and Simulation of Computer and Telecommunication Systems (MASCOTS), held Aug. 2010, Miami, FL, pp. 24-33, Institute of Electrical and Electronics Engineers (IEEE), Digital Object Identifier: 10.1109/MASCOTS.2010.12.

Spiceworks, "Spiceworks Launches Free Cloud Service Detection Features for Small and Mid-sized Businesses", press release, spiceworks.com (online), May 24, 2012 [accessed Jul. 18, 2013], 2 pages, URL: http://www.spiceworks.com/news/press-release/2012/05-24/.

Di Modica, et al., "Resource and Service Discovery in SOAs: A P2P Oriented Semantic Approach", International Journal of Applied Mathematics & Computer Science, Jun. 2011, pp. 285-294, vol. 21, Issue 2, University of Zielona Gora Press, Poland, DOI: 10.2478/v10006-011-0021-2.

Zhou, et al., "A Hybird P2P Approach to Service Discovery in the Cloud", International Journal of Information Technology and Computer Science (IJITCS), Feb. 2011, pp. 1-9, vol. 3, No. 1, Modern Education and Computer Science Press (online publication), Hong Kong, mecs-press.org, URL: http://www.mecs-press.org/ijitcs/ijitcs-v3-n1/IJITCS-V3-N1-1.pdf.

Kroustek, et al, "Retargetable Multi-Level Debugging in HW/SW Codesign", 2011 International Conference on Microelectronics (ICM), pp. 1-6, 19-22, Dec. 2011, IEEE Computer Society, USA.

Vasudevan, et al., "Stealth Breakpoints", Computer Security Applications Conference, 21st Annual, pp. 1-10, Dec. 2005, IEEE Computer Society, USA.

Olsson, et al., "Sequential Debugging at a High Level of Abstraction", Software, IEEE, vol. 8, No. 3, pp. 27-36, May 1991, IEEE Computer Society, USA.

Fagerstrom et al., "A Paradigm and System for Design and Test of Distributed Applications", Digest of Papers, 33$^{rd}$ IEEE Computer Society International Conference, Compcon Spring '88, Feb. 1998, pp. 189-192, IEEE Xplore Digital Library (online), DOI: 10.1109/CMPCON.1988.4857.

Rai et al., "Implementation of DDARC: Software Architecture for Debugging Distributed Programs", ACS/IEEE International Conference on Computer Systems and Applications, Jun. 2001, pp. 220-226, IEEE Xplore Digital Library (online), DOI: 10.1109/AICCSA.2001.933980.

Kurniawan et al., "An Integrated Grid Development Environment in Eclipse", IEEE International Conference on e-Science and Grid Computing, Dec. 2007, pp. 491-498, IEEE Xplore Digital Library (online), DOI: 10.1109/E-SCIENCE.2007.10.

Fagerstrom, "Design and Test of Distributed Applications", Proceedings of the 10th International Conference on Software Engineering, Apr. 1988, pp. 88-92, IEEE Xplore Digital Library (online), DOI: 10.1109/ICSE.1988.93691.

* cited by examiner

MANAGING VIRTUAL MACHINE PATTERNS

BACKGROUND OF THE INVENTION

Field of the Invention

The field of the invention is data processing, or, more specifically, methods, apparatus, and products for managing virtual machine patterns.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Modern computing systems can virtualize many components of the computing system. For example, modern computing systems can include virtual machines that represent a software implementation of a physical machine. Virtual machines may be created easily, and as such, users of a computing system may create too many virtual machines that are poorly organized. In many cases, creating virtual machines in haphazard manner may result in poor utilization of the underlying systems resources that support the virtual machines, unnecessarily complex management of the virtual machines, and degraded performance across the computing system as a whole.

SUMMARY OF THE INVENTION

Methods, apparatuses, and products for managing virtual machine patterns, including: identifying resource utilization of each virtual machine within a first virtual machine pattern; determining resource requirements of one or more applications executing on one or more virtual machines within the first virtual machine pattern; based on the resource utilization and the determined resource requirements, identifying a second virtual machine pattern having a second group of resources; and deploying at least one of the one or more applications executing on the one or more virtual machines within the first virtual machine pattern onto one or more virtual machines of the second virtual machine pattern.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
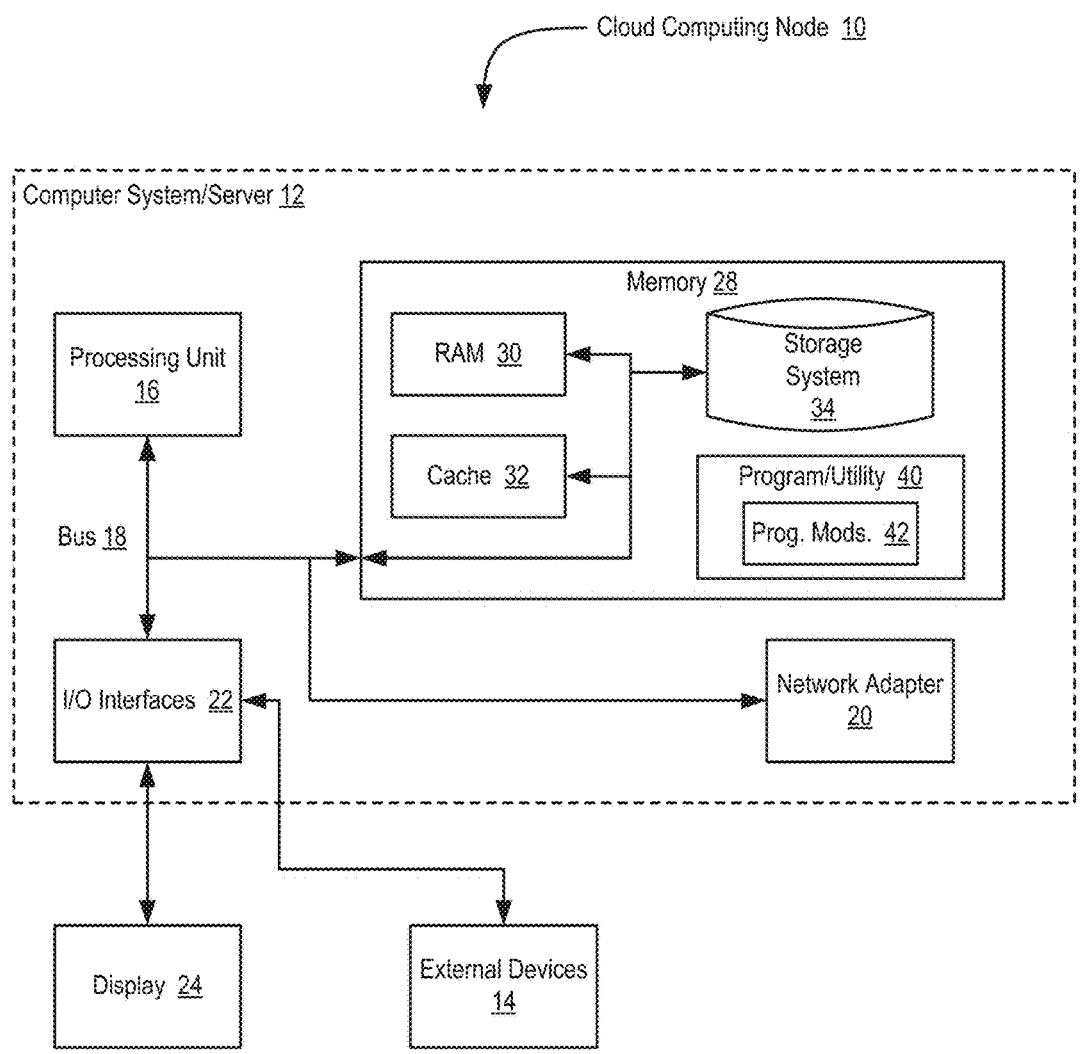
FIG. 1 depicts a cloud computing node according to an embodiment of the present invention.

Example methods, apparatus, and products for managing virtual machine patterns in accordance with the present invention are described with reference to the accompanying drawings, beginning with FIG. 1. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service ('SaaS'): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service ('Paas'): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service ('IaaS'): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node (10) is only one example of a suitable cloud computing node and is not intended to suggest any limitation as to the scope of use or functionality of embodiments of the invention described herein. Regardless, cloud computing node (10) is capable of being implemented and/or performing any of the functionality set forth hereinabove.

In cloud computing node (10) there is a computer system/server (12), which is operational with numerous other general purpose or special purpose computing system environments or configurations. Examples of well-known computing systems, environments, and/or configurations that may be suitable for use with computer system/server (12) include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server (12) may be described in the general context of computer system executable instructions, such as program modules, being executed by a computer system. Generally, program modules may include routines, programs, objects, components, logic, data structures, and so on that perform particular tasks or implement particular abstract data types. Computer system/server (12) may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server (12) in cloud computing node (10) is shown in the form of a general-purpose computing device. The components of computer system/server (12) may include, but are not limited to, one or more processors or processing units (16), a system memory (28), and a bus (18) that couples various system components including system memory (28) to processor (16).

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture ('ISA') bus, Micro Channel Architecture ('MCA') bus, Enhanced ISA ('EISA') bus, Video Electronics Standards Association ('VESA') local bus, and Peripheral Component Interconnect ('PCI') bus.

Computer system/server (12) typically includes a variety of computer system readable media. Such media may be any available media that is accessible by computer system/server (12), and it includes both volatile and non-volatile media, removable and non-removable media.

System memory (28) can include computer system readable media in the form of volatile memory, such as random access memory ('RAM') (30) and/or cache memory (32). Computer system/server (12) may further include other removable/non-removable, volatile/non-volatile computer system storage media. By way of example only, storage system (34) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (18) by one or more data media interfaces. As will be further depicted and described below, memory (28) may include at least one program product having a set (e.g., at least one) of program modules that are configured to carry out the functions of embodiments of the invention.

Program/utility (40), having a set (at least one) of program modules (42), may be stored in memory (28) by way of example, and not limitation, as well as an operating system, one or more application programs, other program modules, and program data. Each of the operating system, one or more application programs, other program modules, and program data or some combination thereof, may include an implementation of a networking environment. Program modules (42) generally carry out the functions and/or methodologies of embodiments of the invention as described herein.

Computer system/server (12) may also communicate with one or more external devices (14) such as a keyboard, a pointing device, a display (24), etc.; one or more devices that enable a user to interact with computer system/server (12); and/or any devices (e.g., network card, modem, etc.) that enable computer system/server (12) to communicate with one or more other computing devices. Such communication can occur via Input/Output ('I/O') interfaces (22). Still yet, computer system/server (12) can communicate with one or more networks such as a local area network (IAN), a general wide area network ('WAN'), and/or a public network (e.g., the Internet) via network adapter (20). As depicted, network adapter (20) communicates with the other components of computer system/server (12) via bus (18). It should be understood that although not shown, other hardware and/or software components could be used in conjunction with computer system/server (12). Examples, include, but are not limited to: microcode, device drivers, redundant processing units, external disk drive arrays, RAID systems, tape drives, and data archival storage systems, etc.

Figure 2:
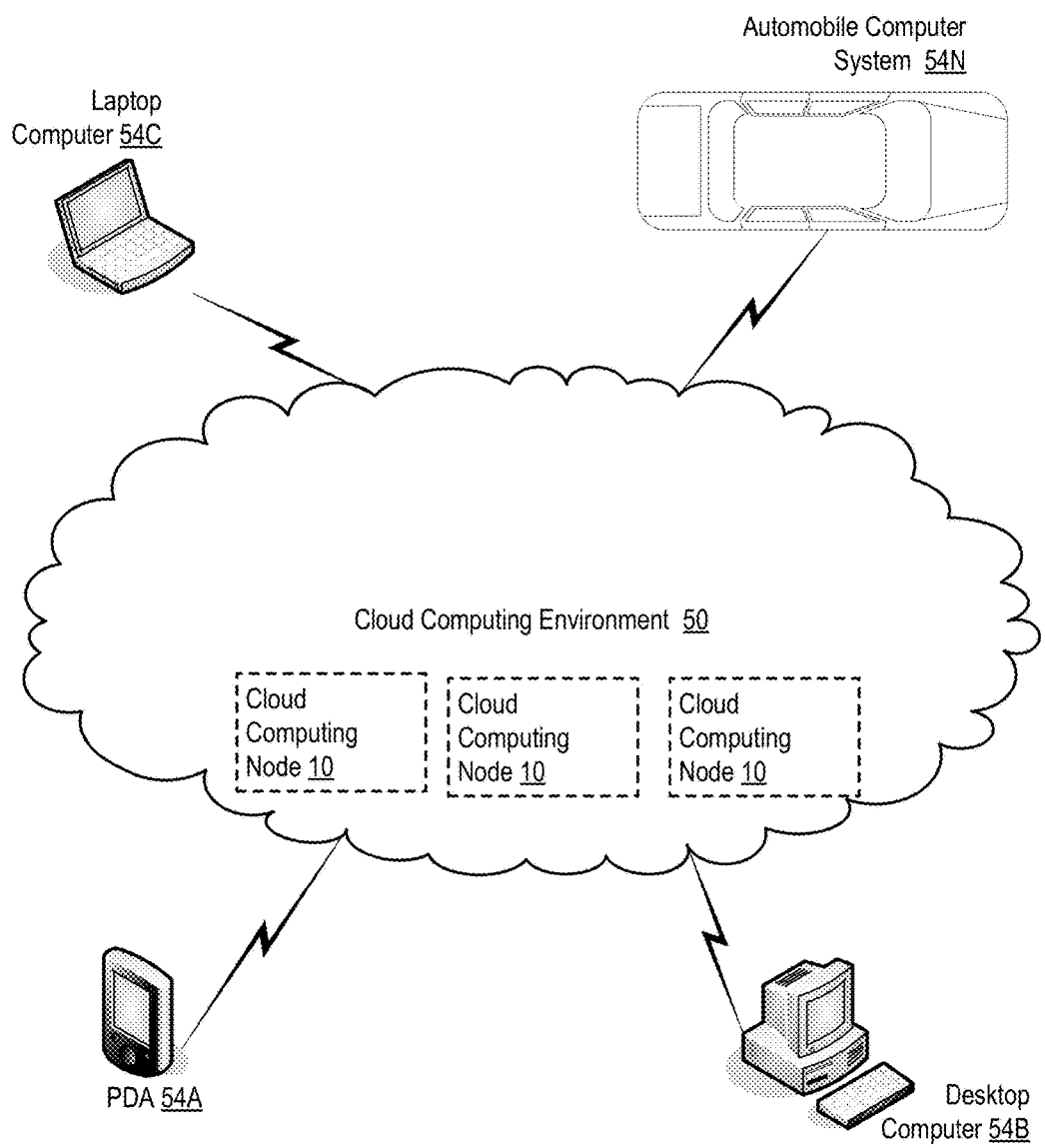
FIG. 2 depicts a cloud computing environment according to an embodiment of the present invention.

Referring now to FIG. 2, illustrative cloud computing environment (50) is depicted. As shown, cloud computing environment (50) comprises one or more cloud computing nodes (10) with which local computing devices used by cloud consumers, such as, for example, personal digital assistant ('PDA') or cellular telephone (54A), desktop computer (54B), laptop computer (54C), and/or automobile computer system (54N) may communicate. The cloud computing nodes (10) may communicate with one another. They may be grouped (not shown) physically or virtually, in one or more networks, such as Private, Community, Public, or Hybrid clouds as described hereinabove, or a combination thereof. This allows cloud computing environment (50) to offer infrastructure, platforms and/or software as services for which a cloud consumer does not need to maintain resources on a local computing device. It is understood that the types of computing devices (54A-N) shown in FIG. 2 are intended to be illustrative only and that cloud computing nodes (10) and cloud computing environment (50) can communicate with any type of computerized device over any type of network and/or network addressable connection (e.g., using a web browser).

Figure 3:
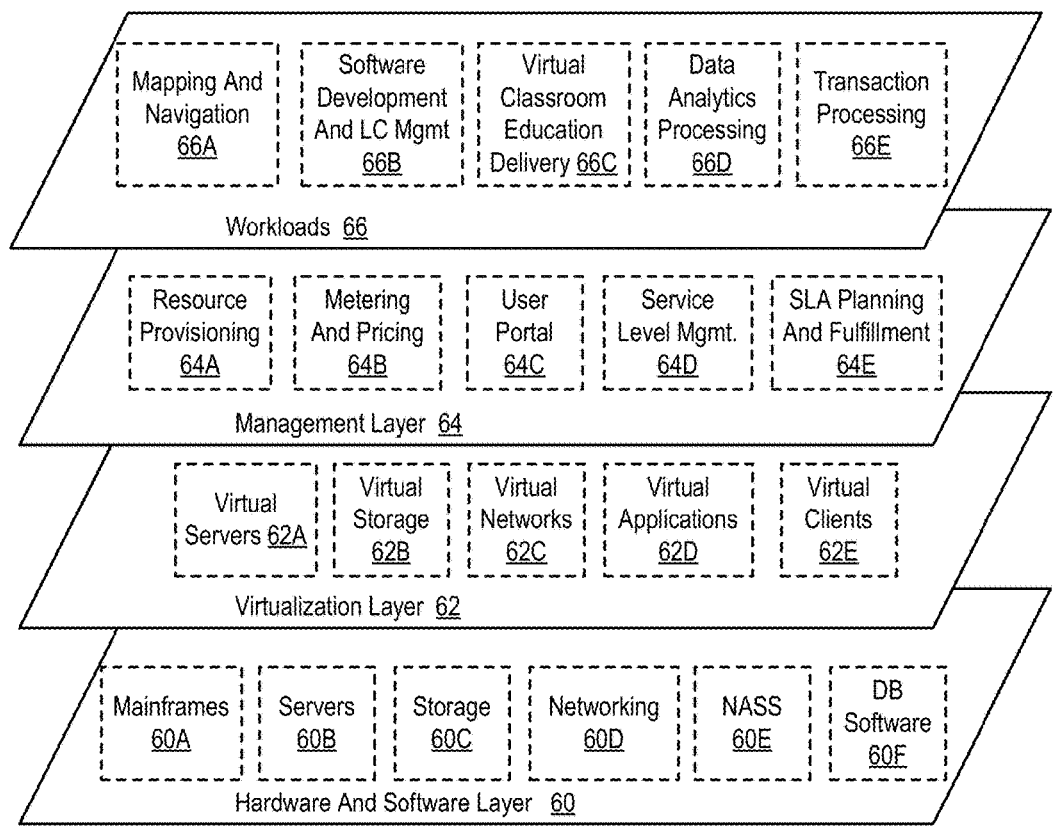
FIG. 3 depicts abstraction model layers according to an embodiment of the present invention.

Referring now to FIG. 3, a set of functional abstraction layers provided by cloud computing environment (element 50 in FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer (60) includes hardware and software components. Examples of hardware components include mainframes (60A), in one example IBM® zSeries® systems; RISC (Reduced Instruction Set Computer) architecture based servers (60B), in one example IBM pSeries® systems; IBM xSeries® systems; IBM BladeCenter® systems; storage devices (60C); networks and networking components (60D). Examples of software components include network application server software (60E), in one example IBM WebSphere® application server software; and database software (60F), in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (62) provides an abstraction layer from which the following examples of virtual entities may be provided: virtual servers (62A); virtual storage (62B); virtual networks (62C), including virtual private networks; virtual applications (62D) and operating systems; and virtual clients (62E).

In one example, management layer (64) may provide the functions described below. Resource provisioning (64A) provides dynamic procurement of computing resources and other resources that are utilized to perform tasks within the cloud computing environment. Metering and Pricing (64B) provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal (64C) provides access to the cloud computing environment for consumers and system administrators. Service level management (64D) provides cloud computing resource allocation and management such that required service levels are met. Service Level Agreement (SLA) planning and fulfillment (64E) provides pre-arrangement for, and procurement of, cloud computing resources for which a future requirement is anticipated in accordance with an SLA.

Workloads layer (66) provides examples of functionality for which the cloud computing environment may be utilized. Examples of workloads and functions which may be provided from this layer include: mapping and navigation (66A); software development and lifecycle management (66B); virtual classroom education delivery (66C); data analytics processing (66D); and transaction processing (66E).

Figure 4:
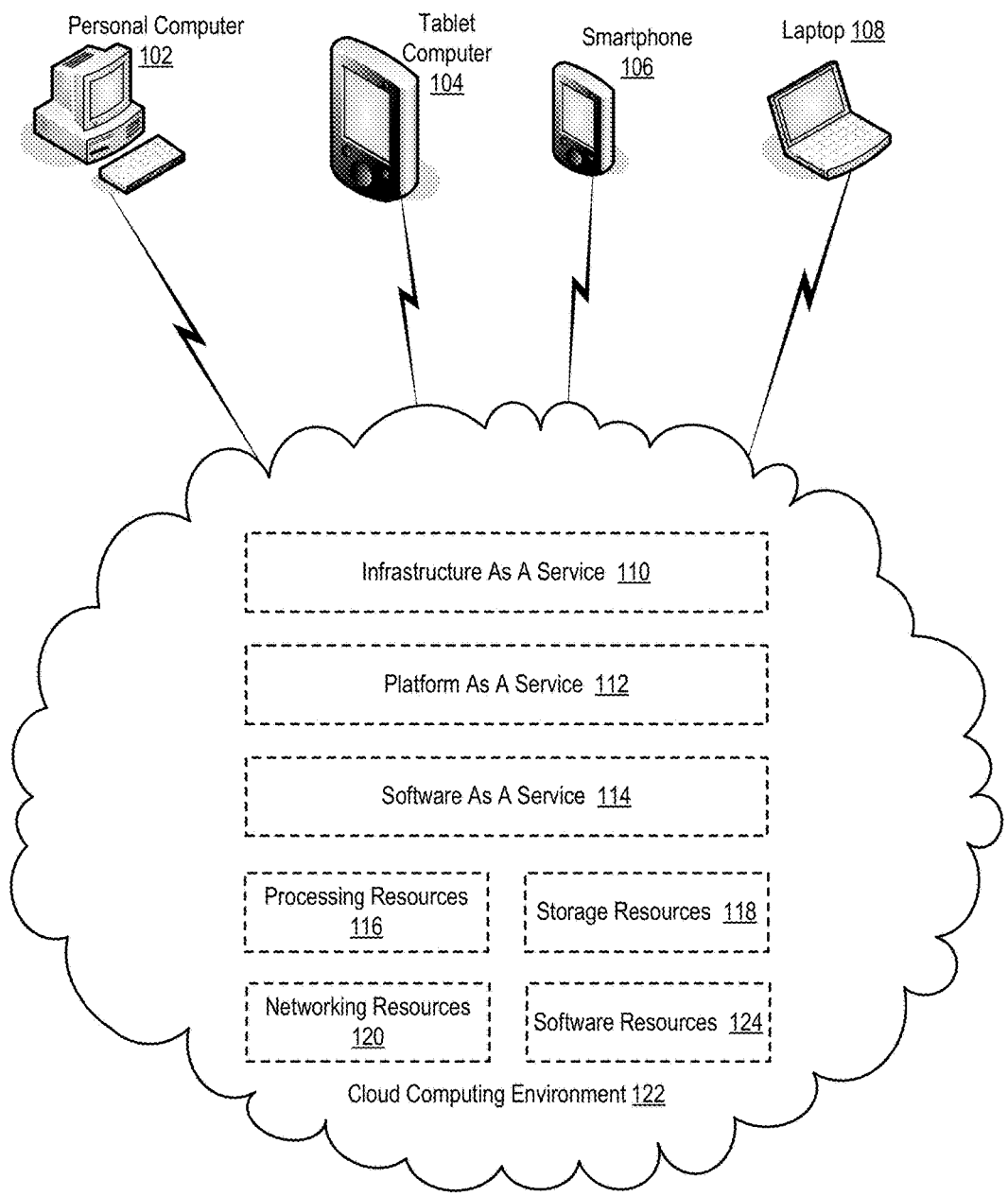
FIG. 4 sets forth a network diagram of a computing environment in which resource allocations may be visually resized according to embodiments of the present invention.

FIG. 4 sets forth a network diagram of a cloud computing environment (122) in which virtual machine patterns may be managed. Cloud computing, as the term is used here, represents a model for enabling ubiquitous, convenient, on-demand access to a shared pool of configurable computing resources. Such computing resources can include data communications networks, computing machinery such as servers, computer storage, software applications, and other resources that that may be rapidly provisioned and released with minimal management effort or interaction from the cloud computing service provider. In the example of FIG. 4, the cloud computing environment (122) can include such a collection of computing resources.

The cloud computing environment (122) of FIG. 4 includes processing resources (116), storage resources (118), networking resources (120), and software resources (124). The processing resources (116) depicted in FIG. 4 represent computer hardware for executing computer program instructions. Such computer hardware can include computer processors and other forms of digital circuits circuitry that may be included in servers, compute nodes, standalone computers, and so on. The storage resources (118) of FIG. 4 represent computer hardware for storing data. Such hardware can includes disk arrays, hard drives, random access memory (RAM), and other forms of computer memory that that may be included in servers, compute nodes, standalone computers, and so on. The networking resources (120) depicted in FIG. 4 represent computer hardware for facilitating data communications between various resources inside the cloud computing environment (122) and for facilitating data communications with computing devices that connect to the cloud computing environment (122). Such computer hardware can include network switches, routers, communications adapters that may be included in servers, compute nodes, standalone computers, and so on. The software resources (124) depicted in FIG. 4 represent computer program instructions that may be executed on the processing resources (116), stored on the storage resources (118), and may communicate over the networking resources (120). Such computer program instructions may include operating systems, special purpose software applications, firmware, and so on. Although the processing resources (116), storage resources (118), networking resources (120), and software resources (124) are depicted as being distinct, readers will appreciate that many of these resources may reside within a single computer such as a server. The separation of such resources is only included to identify the various functionalities provided by each resource.

The cloud computing environment (122) of FIG. 4 may utilize the various resources (116, 118, 120, 124) that reside within the cloud computing environment (122) to provide services to users of the cloud computing environment (122). The cloud computing environment (122) can offer such services according to several fundamental models: infrastructure as a service ('IaaS') (110), platform as a service ('PaaS') (112), and software as a service ('SaaS') (114).

IaaS (110) is a service model in which the cloud computing environment (122) offers computers to users of the cloud computing environment (122). Such computers may be embodied as physical computers or virtual machines that are executing on underlying physical resources with the use of a hypervisor. In such an example, pools of hypervisors in the cloud computing environment (122) may offer a large number of virtual machines to users of the cloud computing environment (122). PaaS (112) is a service model in which the cloud computing environment (122) offers computing platforms to users of the cloud computing environment (122). Such computing platforms can include operating systems, databases, web servers, programming language execution environments, and so on. Saas (114) is a service model in which the cloud computing environment (122) offers access to software applications to users of the cloud computing environment (122).

Many types of devices may communicate with the cloud computing environment (122) of FIG. 4 and may take advantage of the services provided by the cloud computing environment (122). In the example of FIG. 4, a personal computer (102), tablet computer (104), smartphone (106), and laptop computer (108) are depicted as being coupled for data communications with the cloud computing environment (122), although readers will appreciate that many other types of computing devices may also be coupled for data communications with the cloud computing environment (122). Such devices may be coupled for data communications with the cloud computing environment (122), for example, over a data communications network such as the Internet, telecommunications networks, wireless networks, and so on.

The arrangement of computing resources and other devices making up the example cloud computing environment (122) illustrated in FIG. 4 are for explanation, not for limitation. Cloud computing environments useful according to various embodiments of the present invention may include additional servers, routers, other devices, and peer-to-peer architectures, not shown in FIG. 4, and so on. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 4. Readers will further appreciate that many of the devices illustrated in FIG. 4 may be embodied as virtualized devices. For example, the cloud computing environment (122) may include virtual machines coupled for data communications by virtual routers and other virtualized networking components.

Readers will further appreciate that the example cloud computing environment (122) illustrated in FIG. 4 is simply one example of a cloud computing environment. Cloud computing environments according to embodiments of the present application may take many other forms, and may actually be implemented across multiple clouds. For example, one cloud could have a private IaaS on a single server provider while two different private clouds run IaaS using different implementations of hardware.

Figure 5:
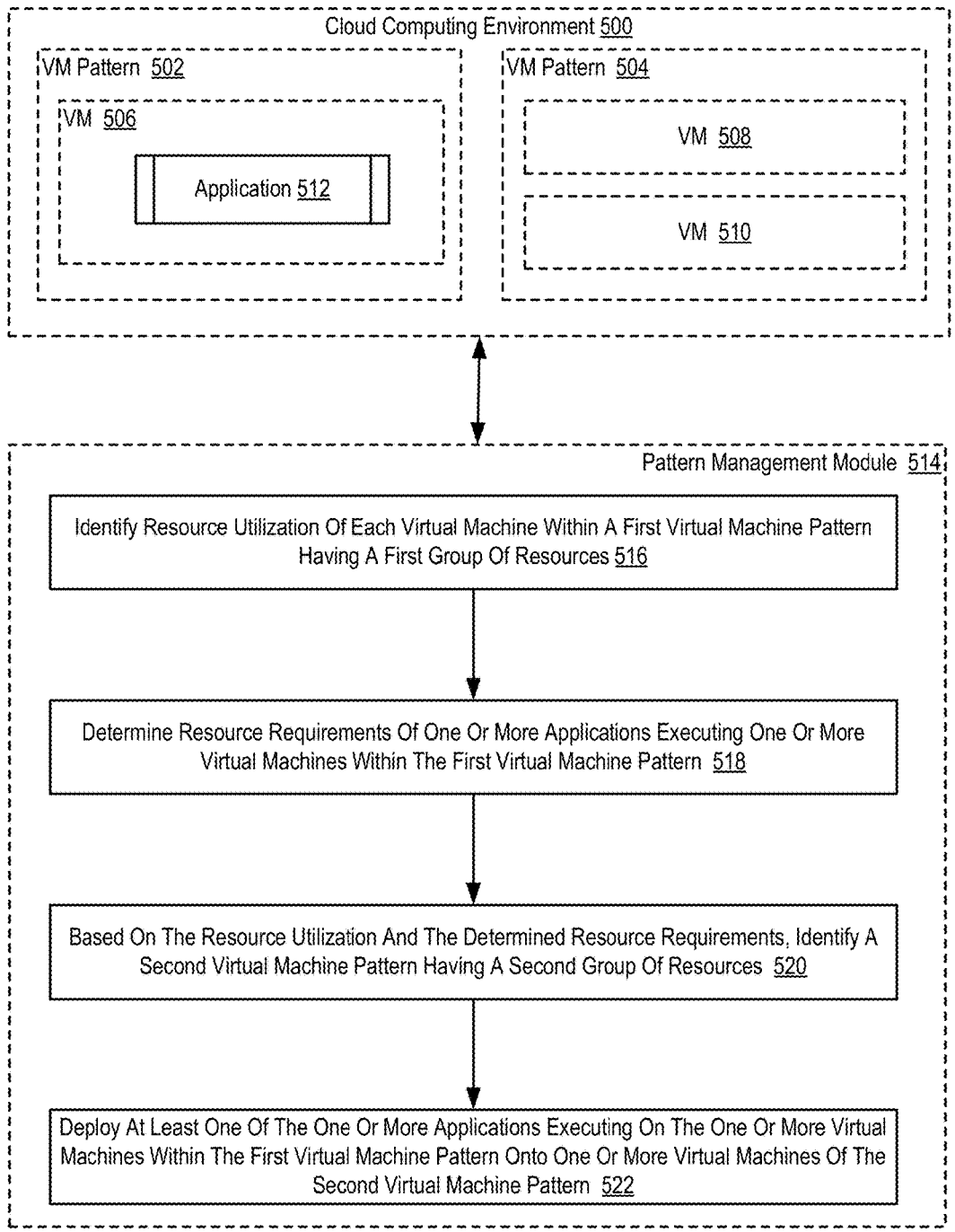
FIG. 5 sets forth a flow chart illustrating an example method for managing virtual machine patterns according to embodiments of the present invention.

For further explanation, FIG. 5 sets forth a flow chart illustrating an example method for managing virtual machine patterns (502, 504) according to embodiments of the present invention. The example method of FIG. 5 is carried out, at least in part, by a pattern management module (514). In the example method of FIG. 5, the pattern management module (514) may be embodied as a module of computer program instructions executing on computer hardware such as a computer processor. The pattern management module (514) may reside, for example, within a larger system management module for monitoring a plurality of resources, physical and virtual, within a computing system such as the cloud computing environment (500).

The example method of FIG. 5 includes identifying (516) resource utilization of each virtual machine (506) within a first virtual machine pattern (502) having a first group of resources. In the example method of FIG. 5, each virtual machine (506) may be embodied as a software implementation of a physical machine that executes programs like a physical machine. In the example method of FIG. 5, the virtual machine (506) may be supported by physical resources such as processors, memory, network adapters, storage, and the like. In such a way, identifying (516) resource utilization of a particular virtual machine (506) may be carried out by determining the extent to which the particular virtual machine (506) utilizes the underlying resources that support the particular virtual machine (506).

In the example method of FIG. 5, resource utilization is identified (516) for each virtual machine (506) within the first virtual machine pattern (502) having a first group of resources. In the example method of FIG. 5, a 'virtual machine pattern' represents one or more virtual entities, such as a virtual machine, virtual storage, virtual local area network (VLAN), and others that are managed as a single entity. Each virtual machine pattern can include, for example, a plurality of virtual machines that support a single application (512) such as a database server, web server, application server, and so on. Readers will appreciate that each virtual machine (506, 508, 510) in a virtual machine pattern (502, 504) is supported by underlying physical resources such as computer processors, computer memory, network adapters, and so on. In such an example, identifying (516) resource utilization of each virtual machine (506) within a first virtual machine pattern (502) may therefore be carried out by determining the extent to which each virtual machine in the first virtual machine pattern (502) is utilizing the underlying physical resources that support each virtual machine (506) within the first virtual machine pattern (502). In such a way, the first virtual machine pattern (502) is said to have a first group of resources, which can include the virtual machines (506) in the first virtual machine pattern (502), the applications (512) executing on the virtual machines (506) in the first virtual machine pattern (502), the underlying physical resources that support the virtual machines (506) in the first virtual machine pattern (502), and so on.

The example method of FIG. 5 also includes determining (518) resource requirements of each application (512) executing on one or more virtual machines (506) within the first virtual machine pattern (502). Determining (518) resource requirements of each application (512) executing on one or more virtual machines (506) within the first virtual machine pattern (502) may be carried out, for example, by examining metadata associated with each application (512) that specifies the resource requirements of each application (512), by receiving resource requirements of each application (512) from a system administrator, by receiving required performance metrics for each application (512) and performing testing operations with various configurations of resources allocated to each application (512) to identify configurations that enable each application (512) to reach required performance metrics, and so on.

The example method of FIG. 5 also includes, based on the resource utilization and the determined resource requirements, identifying (520) a second virtual machine pattern (504) having a second group of resources. Identifying (520) a second virtual machine pattern (504) having a second group of resources based on the resource utilization and the determined resource requirements may be carried out, for example, through the use of a rules engine that provides design rules for consolidation of the virtual machines and for efficient deployment of applications. Such a rules engine may include algorithms, for example, that selects a second virtual machine pattern (504) upon which the applications (512) may be deployed based on the resource utilization of the applications (512) and the determined resource requirements of the applications (512).

Consider an example in which the determined resource requirements indicate that a particular application (512) executing on a virtual machine (506) within the first virtual machine pattern (502) requires at least three CPUs and that the application (512) is presently deployed on a virtual machine (506) within the first virtual machine pattern (502) that has eight CPUs allocated to the virtual machine (506). Further assume that the identified (516) resource utilization of the virtual machine (506) within the first virtual machine pattern (502) indicates that the virtual machine (506) is currently utilizing the eight CPUs at an aggregate CPU utilization rate of 50%. In such an example, the rules engine may include algorithms that select a second virtual machine pattern (504) upon which the application (512) may be deployed by calculating the lowest number of CPUs that must be available to a virtual machine such that: 1) the determined resource requirements for the application (512) are met, and 2) resource utilization is greater than a predetermined threshold. For example, the algorithms may identify a second virtual machine pattern (504) that includes five virtual machines, each of which has a CPU that is identical to the eight CPUs in the first virtual machine pattern (502). In such an example, the second virtual machine pattern (504) satisfies the determined resource requirements (three CPUs) and executing the application (512) on the five virtual machines of the second virtual machine pattern (504) would result in 80% CPU utilization if the workload were identical to the workload that resulted in 50% CPU utilization of a virtual machine supported by eight CPUs.

Readers will appreciate that the rules engine may include many additional algorithms that take into account resource requirements and resource utilization information associated with many other resource types. For example, the rules engine may include many additional algorithms that take into memory requirements and utilization information, network bandwidth requirements and utilization information, and many others. In addition, the rules engine may include many additional algorithms that take into account resource requirements and resource utilization information associated with a combination of two or more resource types.

The example method of FIG. 5 also includes deploying (522) at least one of the one or more applications (512) executing on the virtual machine (506) within the first virtual machine pattern (502) onto one or more virtual machines (508, 510) of the second virtual machine pattern (504). In the example method of FIG. 5, deploying (522) at least one of the one or more applications (512) executing on the virtual machine (506) within the first virtual machine pattern (502) onto one or more virtual machines (508, 510) of the second virtual machine pattern (504) may be carried out by pausing execution of an application (512) executing on the virtual machine (506) within the first virtual machine pattern (502), copying state information such as execution variables for the application (512), installing the source code and the state information for the application (512) onto the one or more virtual machines (508, 510) of the second virtual machine pattern (504), and resuming execution of the application (512) on the one or more virtual machines (508, 510) of the second virtual machine pattern (504).

Readers will appreciate that the pattern management module (514) of FIG. 5 may include, or communicate with, a pattern advisor configured to recommend that one or more applications in a first virtual machine pattern be deployed onto a second virtual machine pattern. In such an example, rather than automatically deploying the one or more applications in a first virtual machine pattern onto a second virtual machine pattern, the pattern advisor may make a recommendation to a system administrator that one or more applications in the first virtual machine pattern be deployed onto the second virtual machine pattern, such that the ultimate decision to migrate the applications is made by the system administrator.

Readers will further appreciate that the pattern management module (514) of FIG. 5 may be configured to update deployment rules for deploying one or more applications upon migrating the one or more applications from a first virtual machine pattern onto a second virtual machine pattern. Consider an example in which a particular set of applications that provide a particular service are launched on a first virtual machine pattern. In such an example, if the pattern management module (514) determines that the particular set of applications need to be migrated to a second virtual machine pattern, after such a migration occurs, the pattern management module (514) may update deployment rules for deploying the particular set of applications in the future. As such, when the particular set of applications are launched at a later point in time, the particular set of applications can be launched on the second virtual machine pattern, thereby eliminating the need to perform a subsequent migration.

Figure 6:
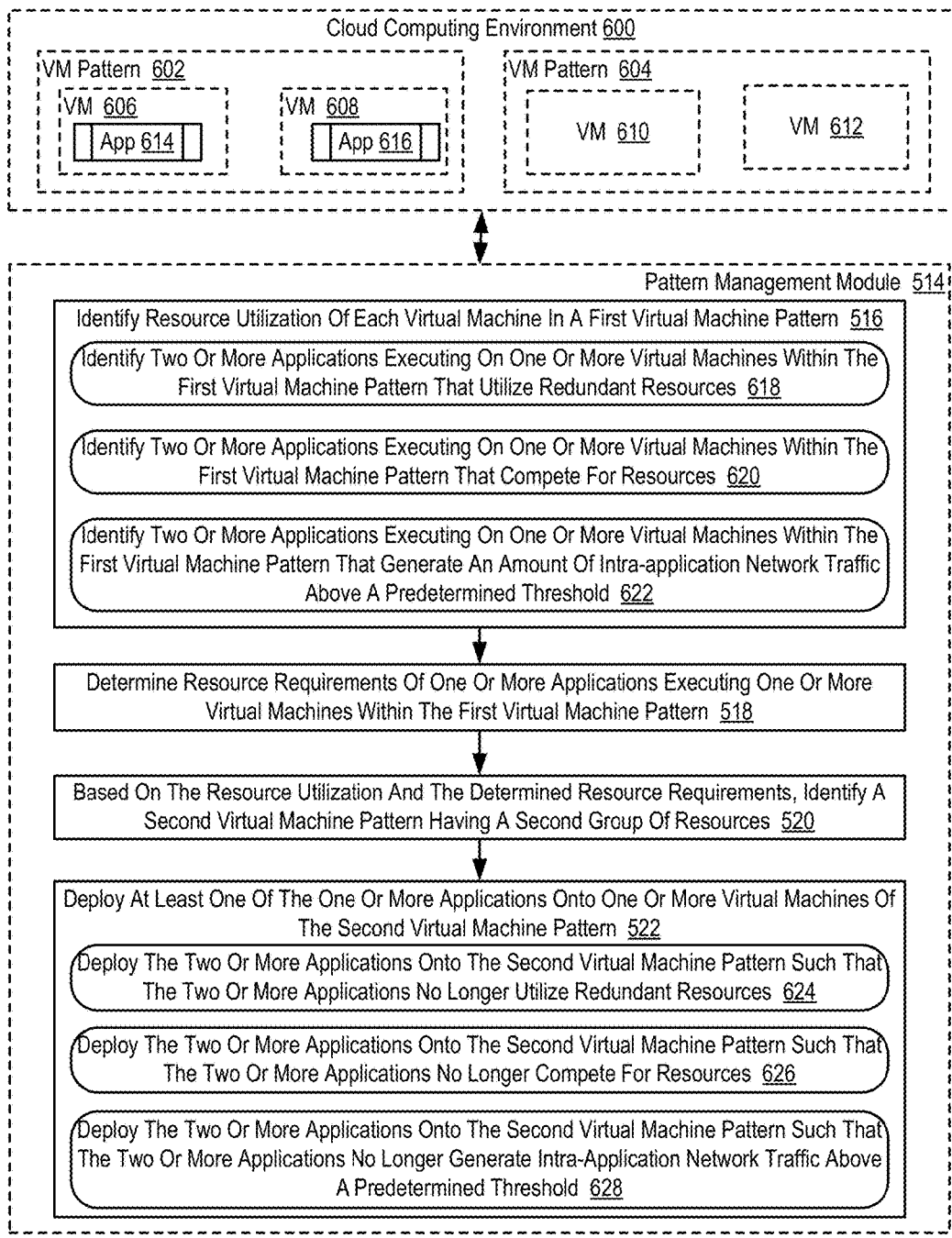
FIG. 6 sets forth a flow chart illustrating an additional example method for managing virtual machine patterns according to embodiments of the present invention.

For further explanation, FIG. 6 sets forth a flow chart illustrating an additional example method for managing virtual machine patterns (602, 604) according to embodiments of the present invention. The example method of FIG. 6 is similar to the example method of FIG. 5, as it also includes identifying (516) resource utilization of each virtual machine (606, 608) within a first virtual machine pattern (602), determining (518) resource requirements of each application (614, 616) executing on one or more virtual machines (606, 608) within the first virtual machine pattern (602), identifying (520) a second virtual machine pattern (604) having a second group of resources based on the resource utilization and the determined resource requirements, and deploying (522) at least one of the one or more applications (614, 616) executing on the virtual machines (606, 608) within the first virtual machine pattern (602) onto one or more virtual machines (610, 612) of the second virtual machine pattern (604).

In the example method of FIG. 6, identifying (516) resource utilization of each virtual machine (606, 608) within a first virtual machine pattern (602) can include identifying (618) two or more applications (614, 616) executing on one or more virtual machines (606, 608) within the first virtual machine pattern (602) that utilize redundant resources. In the example method of FIG. 6, redundant resources may include resources that are replicas or duplicates of one another. Consider an example in which a first application (614) executes on a virtual machine (606) that utilizes a particular version of an operating system and a second application (616) executes on a virtual machine (608) that utilizes the same version of the operating system. In such an example, having two instances of the same operating system may be redundant as a single version of the same operating system could service the two application (614, 616). In such an example, having two instances of the same operating system may consume unnecessary resources as a single instance of the operating system would only need to be stored in one area of memory and executed by only one processor, rather than storing each individual instance in its own area of memory and executing each instance of the operating system on its own processor. In such an example, identifying (618) two or more applications (614, 616) executing on one or more virtual machines (606, 608) within the first virtual machine pattern (602) that utilize redundant resources may be carried out, for example, by identifying each resource utilized by each virtual machine (606, 608) and determining whether any of the resources are redundant. In such an example, some particular types of resources may be identified by a system administrator or other management entity as being redundant copies of the same resource.

In the example method of FIG. 6, deploying (522) at least one of the one or more applications (614, 616) executing on the virtual machines (606, 608) within the first virtual machine pattern (602) onto one or more virtual machines (610, 612) of the second virtual machine pattern (604) can therefore include deploying (624) the two or more applications (614, 616) onto one or more virtual machines (610, 612) of the second virtual machine pattern (604) such that the two or more applications (614, 616) no longer utilize redundant resources. Deploying (624) the two more applications (614, 616) onto one or more virtual machines (610, 612) of the second virtual machine pattern (604) such that the two or more applications (614, 616) no longer utilize redundant resources may be carried out, for example, by deploying each application (614, 616) onto one virtual machine (610) within the second virtual machine pattern (604), by deploying each application (614, 616) onto multiple virtual machines (610, 612) within the second virtual machine pattern (604) that utilize the same version of an otherwise redundant resource, and so on.

Consider the example described above in which the first application (614) and the second application (616) execute on virtual machines (606, 608) that utilize the same version of an operating system. In such an example, deploying (624) the two or more applications (614, 616) onto one or more virtual machines (610, 612) of the second virtual machine pattern (604) such that the two or more applications (614, 616) no longer utilize redundant resources may be carried out by deploying (624) the two applications (614, 616) on a single virtual machine (610) within the second virtual machine pattern (604) that utilizes the same version of the operating system. Deploying (624) the two or more applications (614, 616) onto one or more virtual machines (610, 612) of the second virtual machine pattern (604) such that the two or more applications (614, 616) no longer utilize redundant resources may therefore be carried out by identifying one or more virtual machines (610, 612) that utilize only a single instance of the redundant resources and deploying the two or more applications (614, 616) on the one or more virtual machines (610, 612).

In the example method of FIG. 6, identifying (516) resource utilization of each virtual machine (606, 608) within a first virtual machine pattern (602) can alternatively include identifying (620) two or more applications (614, 616) executing on one or more virtual machines (606, 608) within the first virtual machine pattern (602) that compete for resources. Consider an example in which the two or more applications (614, 616) are each email applications, where the first application (614) is executing on a first virtual machine (606) executing on a single server and the second application (616) is executing on a second virtual machine (608) executing on the same server. In such an example, each application (606, 608) may attempt to send and receive messages over the same port in the server. In such an example, each application (606, 608) is competing for the same resource—the port in the server. Identifying (620) two or more applications (614, 616) executing on one or more virtual machines (606, 608) within the first virtual machine pattern (602) that compete for resources may therefore be carried out, for example, by identifying each resource utilized by each application (614, 616) and determining whether resources utilized by both applications (614, 616) may be used concurrently, or whether resources utilized by both applications (614, 616) must be utilized exclusively by a single application (614, 616). In such an example, some particular types of resources may be identified by a system administrator or other management entity as being only available for utilization exclusively by a single application (614, 616) at a given point in time.

In the example method of FIG. 6, deploying (522) at least one of the one or more applications (614, 616) executing on the virtual machines (606, 608) within the first virtual machine pattern (602) onto one or more virtual machines (610, 612) of the second virtual machine pattern (604) can therefore include deploying (626) the two or more applications (614, 616) onto one or more virtual machines (610, 612) of the second virtual machine pattern (604) such that the two or more applications (614, 616) no longer compete for resources. Deploying (626) the two or more applications (614, 616) onto one or more virtual machines (610, 612) of the second virtual machine pattern (604) such that the two or more applications (614, 616) no longer compete for resources may be carried out, for example, by deploying each application (614, 616) onto a distinct virtual machine (610, 612) within the second virtual machine pattern (604), where each distinct virtual machine (610, 612) can provide a distinct version of the resource that the applications (614, 616) previously competed for.

Consider the example described above in which the first application (614) and the second application (616) execute on virtual machines (606, 608) residing on a single server in the cloud computing environment (600) such that each application (614, 616) attempts to make use of the same port on the server. In such an example, deploying (626) the two or more applications (614, 616) onto one or more virtual machines (610, 612) of the second virtual machine pattern (604) such that the two or more applications (614, 616) no longer compete for resources may be carried out by deploying the applications (614, 616) on virtual machines (610, 612) that reside on distinct physical servers (i.e., anti-colocation), such that each application (614, 616) has access to ports on different servers. In an alternative solution, a new virtual LAN could be created that maps the same virtual ports to different physical ports, thereby curing the competition for a resource. In such a way, deploying (626) the two or more applications (614, 616) onto one or more virtual machines (610, 612) of the second virtual machine pattern (604) such that the two or more applications (614, 616) no longer compete for resources may be carried out by identifying two virtual machines (610, 612) that are supported by distinct instances of the competed for resource.

In the example method of FIG. 6, identifying (516) resource utilization of each virtual machine (606, 608) within a first virtual machine pattern (602) can alternatively include identifying (622) two or more applications (614, 616) executing on one or more virtual machines (606, 608) within the first virtual machine pattern (602) that generate an amount of intra-application network traffic above a predetermined threshold. In the example method of FIG. 6, two or more applications (614, 616) executing within the first virtual machine pattern (602) may communicate with each other so as to generate data communications traffic between the two applications (614, 616). In instances where the two or more applications (614, 616) are executing on virtual machines (606, 608) that communicate over a data communications network—such as virtual machines (606, 608) that reside on two physically separate servers—the data communications traffic between the two applications (614, 616) may represent intra-application network traffic. In such an example, when the amount of intra-application network traffic generated between the two applications (614, 616) is above a predetermined threshold, the two applications (614, 616) may be consolidated onto a single virtual machine (606), such that network traffic is eliminated as communications between the two applications (614, 616) never leave the single virtual machine (606). Identifying (622) two or more applications (614, 616) executing on one or more virtual machines (606, 608) within the first virtual machine pattern (602) that generate an amount of intra-application network traffic above a predetermined threshold may be carried out, for example, by monitoring the amount of network traffic that flows between the two or more applications (614, 616) and comparing the monitored traffic to a predetermined threshold established by a system administrator at the time that each application (614, 616) began executing.

In the example method of FIG. 6, deploying (522) at least one of the one or more applications (614, 616) executing on the virtual machines (606, 608) within the first virtual machine pattern (602) onto one or more virtual machines (610, 612) of the second virtual machine pattern (604) can therefore include deploying (628) the two or more applications (614, 616) onto one or more virtual machines (610, 612) of the second virtual machine pattern (604) such that the two or more applications (614, 616) no longer generate intra-application network traffic above a predetermined threshold. In the example method of FIG. 6, deploying (628) the two or more applications (614, 616) onto one or more virtual machines (610, 612) of the second virtual machine pattern (604) such that the two or more applications (614, 616) no longer generate intra-application network traffic above a predetermined threshold may be carried out, for example, by identifying one or more virtual machines (610, 612) of the second virtual machine pattern (604) that do not need a data communications network to support data communications between the one or more virtual machines (610, 612) of the second virtual machine pattern (604). For example, two virtual machines (610, 612) may reside on the same physical server and may therefore communicate through shared memory, interprocess communications, and so on. In such an example, the two or more applications (614, 616) may be deployed (628) on the identified one or more virtual machines (610, 612) of the second virtual machine pattern (604) that do not need a data communications network to support data communications between the one or more virtual machines (610, 612).

Figure 7:
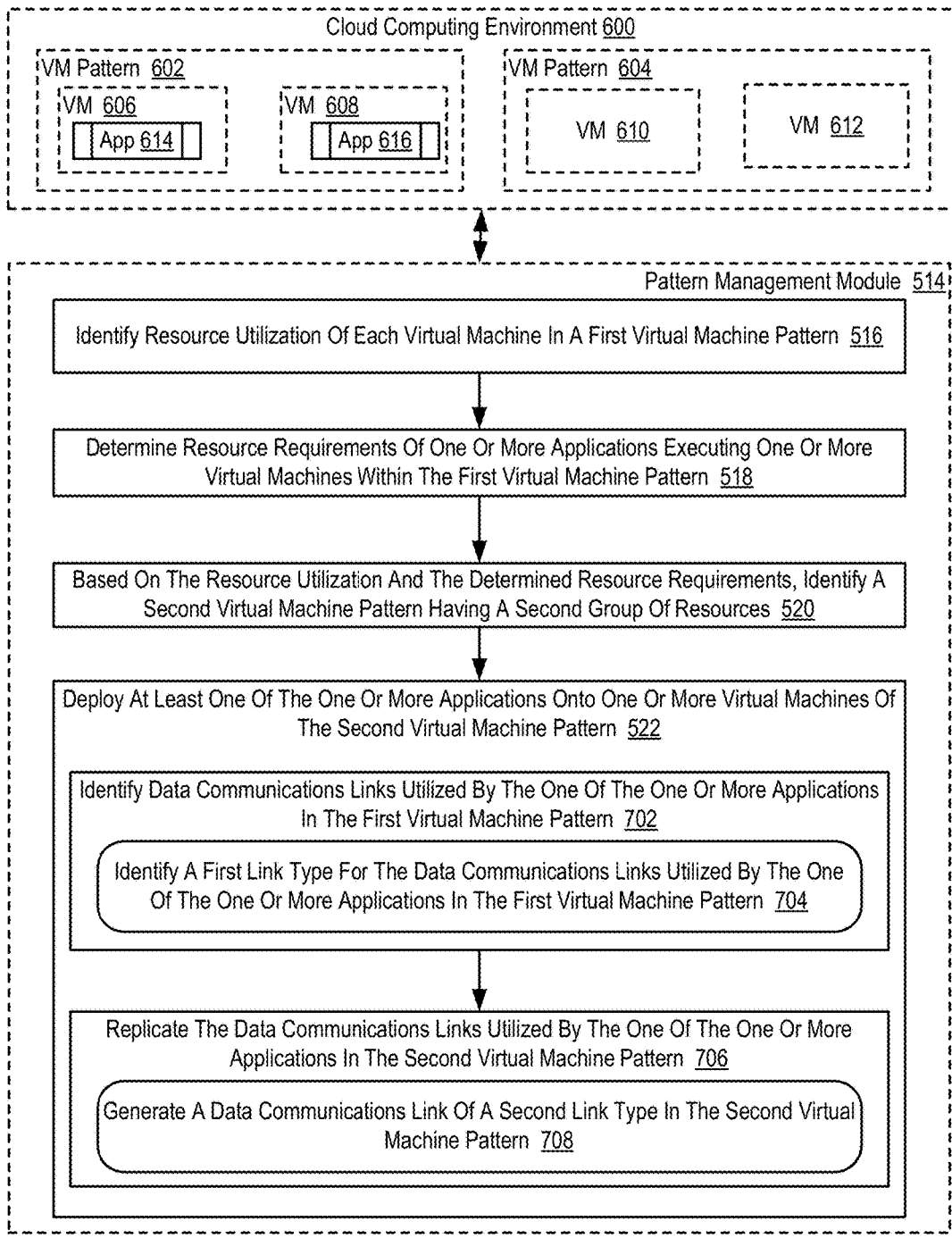
FIG. 7 sets forth a flow chart illustrating an additional example method for managing virtual machine patterns according to embodiments of the present invention.

For further explanation, FIG. 7 sets forth a flow chart illustrating an additional example method for managing virtual machine patterns (602, 604) according to embodiments of the present invention. The example method of FIG. 7 is similar to the example methods of FIG. 5 and FIG. 6, as it also includes identifying (516) resource utilization of each virtual machine (606, 608) within a first virtual machine pattern (602), determining (518) resource requirements of each application (614, 616) executing on one or more virtual machines (606, 608) within the first virtual machine pattern (602), identifying (520) a second virtual machine pattern (604) having a second group of resources based on the resource utilization and the determined resource requirements, and deploying (522) at least one of the one or more applications (614, 616) executing on the virtual machines (606, 608) within the first virtual machine pattern (602) onto one or more virtual machines (610, 612) of the second virtual machine pattern (604).

In the example method of FIG. 7, deploying (522) at least one of the one or more applications (614, 616) executing on the virtual machines (606, 608) within the first virtual machine pattern (602) onto one or more virtual machines (610, 612) of the second virtual machine pattern (604) can include identifying (702) data communications links utilized by the one of the one or more applications (614, 616) in the first virtual machine pattern (602). In the example method of FIG. 7, identifying (702) data communications links utilized by the one of the one or more applications (614, 616) in the first virtual machine pattern (602) may include identifying data communications links to resources utilized by the one of the one or more applications (614, 616) in the first virtual machine pattern (602), identifying data communications links to other applications that the one or more applications (614, 616) in the first virtual machine pattern (602) communicates with, and so on. In such an example, identifying (702) data communications links utilized by the one of the one or more applications (614, 616) in the first virtual machine pattern (602) may be carried out by inspecting metadata associated with each virtual machine (606, 608) that an application is executing on to identify data communications capabilities of the virtual machine (606, 608), by inspecting communications logs for each virtual machine (606, 608) that an application is executing on to identify the source of incoming and outgoing data communications, and so on.

In the example method of FIG. 7, identifying (702) data communications links utilized by the one of the one or more applications (614, 616) in the first virtual machine pattern (602) can include identifying (704) a first link type for the data communications links utilized by the one of the one or more applications (614, 616) in the first virtual machine pattern (602). In the example method of FIG. 7, identifying (704) a first link type for the data communications links utilized by the one of the one or more applications (614, 616) in the first virtual machine pattern (602) may be carried out, for example, by determining the type of network adapter that the virtual machines (606, 608) within the first virtual machine pattern (602) utilize for data communications, by inspecting incoming and outgoing packets to identify the network protocol utilized to transmit such packets, and so on.

In the example method of FIG. 7, deploying (522) at least one of the one or more applications (614, 616) executing on the virtual machines (606, 608) within the first virtual machine pattern (602) onto one or more virtual machines (610, 612) of the second virtual machine pattern (604) can also include replicating (706) the data communications links utilized by the one of the one or more applications (614, 616) in the second virtual machine pattern (604). In the example method of FIG. 7, replicating (706) the data communications links utilized by the one of the one or more applications (614, 616) in the second virtual machine pattern (604) may be carried out, for example, by configuring the one or more applications (614, 616) in the second virtual machine pattern (604) with a network address of a resource that the applications (614, 616) communicated with while deployed on the first virtual machine pattern (602), by allocating shared memory for the one or more applications (614, 616) in the second virtual machine pattern (604) to read messages from and write messages to, and so on.

In the example method of FIG. 7, replicating (706) the data communications links utilized by the one of the one or more applications (614, 616) in the second virtual machine pattern (604) can include generating (708) a data communications link of a second link type in the second virtual machine pattern (604). Consider an example in which the data communications links utilized by the one of the one or more applications (614, 616) in the first virtual machine pattern (602) is an Ethernet link. In such an example, assume that the one of the one or more applications (614, 616) in the second virtual machine pattern (604) are executing on virtual machines (610, 612) residing on servers that are connected via an InfiniBand link. In such an example, generating (708) a data communications link of a second link type in the second virtual machine pattern (604) may be carried out by establishing a connection over an InfiniBand link between the one of the one or more applications (614, 616) in the second virtual machine pattern (604).

Managing virtual machine patterns in accordance with the present invention is generally implemented with computers, that is, with automated computing machinery. For further explanation, therefore, FIG. 8 sets forth a block diagram of automated computing machinery comprising an example computer (852) useful in managing virtual machine patterns according to embodiments of the present invention. The computer (852) of FIG. 8 includes at least one computer processor (856) or 'CPU' as well as random access memory (868) ('RAM') which is connected through a high speed memory bus (866) and bus adapter (858) to processor (856) and to other components of the computer (852).

Stored in RAM (868) is a pattern management module (803), a module of computer program instructions for managing virtual machine patterns according to embodiments of the present invention. The pattern management module (803) of FIG. 8 may be configured to manage virtual machine patterns by: identifying resource utilization of each virtual machine (806, 808) within a first virtual machine pattern (802); determining resource requirements of one or more applications (814, 816) executing on one or more virtual machines (806, 808) within the first virtual machine pattern (802); based on the resource utilization and the determined resource requirements, identifying a second virtual machine pattern (804) having a second group of resources; and deploying at least one of the one or more applications (814, 816) executing on the one or more virtual machines (806, 808) within the first virtual machine pattern (802) onto one or more virtual machines (810, 812) of the second virtual machine pattern (804) in a cloud computing environment (801).

Also stored in RAM (868) is an operating system (854). Operating systems useful in managing virtual machine patterns according to embodiments of the present invention include UNIX™, Linux™, Microsoft XP™, AIX™, IBM's i5/OS™, and others as will occur to those of skill in the art. The operating system (854) and the pattern management module (803) in the example of FIG. 8 are shown in RAM (868), but many components of such software typically are stored in non-volatile memory also, such as, for example, on a disk drive (870).

Figure 8:
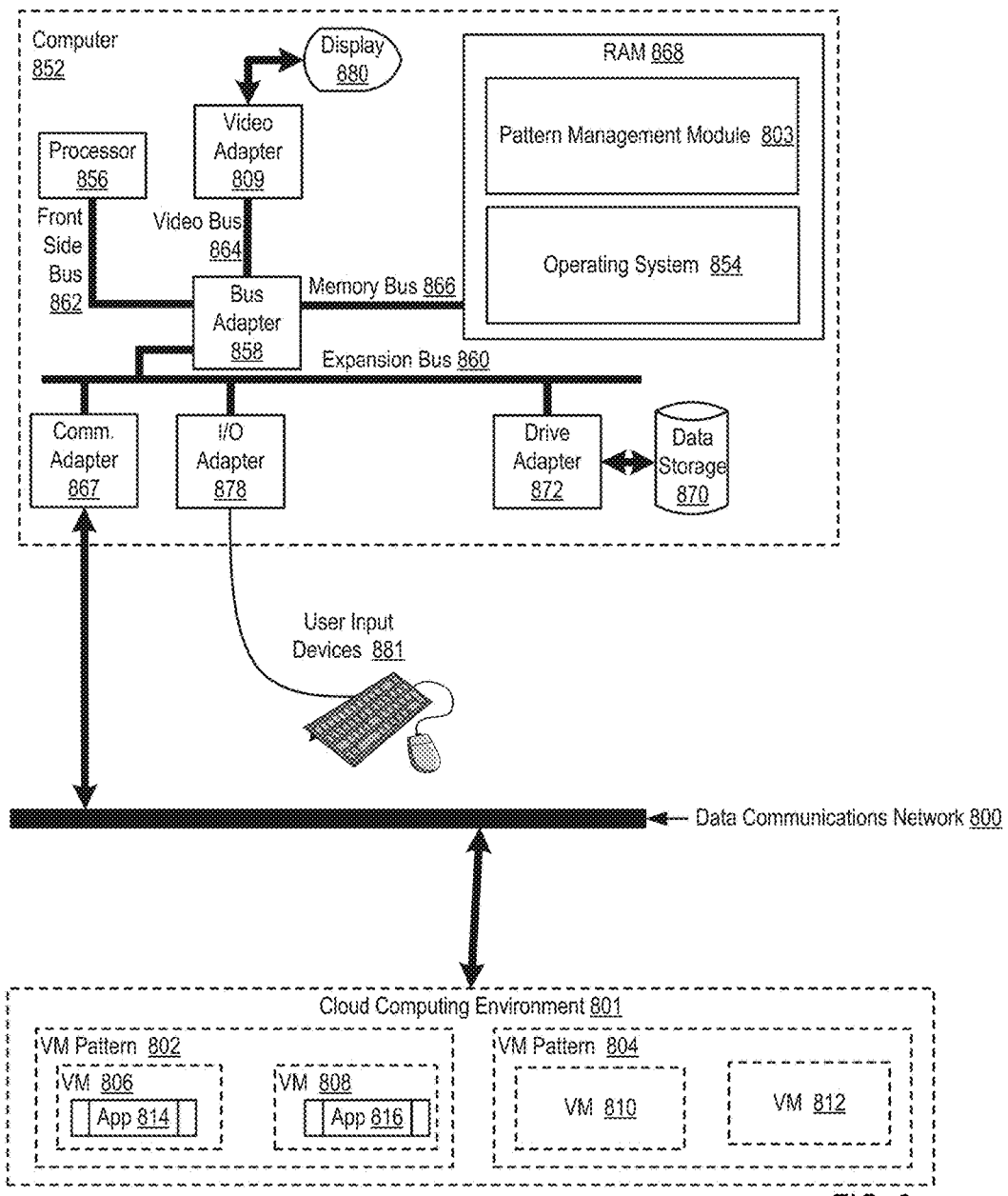
FIG. 8 sets forth a block diagram of automated computing machinery comprising an example computer useful in managing virtual machine patterns according to embodiments of the present invention.

The computer (852) of FIG. 8 includes disk drive adapter (872) coupled through expansion bus (860) and bus adapter (858) to processor (856) and other components of the computer (852). Disk drive adapter (872) connects non-volatile data storage to the computer (852) in the form of disk drive (870). Disk drive adapters useful in computers for managing virtual machine patterns according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (852) of FIG. 8 includes one or more input/output ('I/O') adapters (878). I/O adapters implement user-oriented input/output through, for example, software drivers and computer hardware for controlling output to display devices such as computer display screens, as well as user input from user input devices (881) such as keyboards and mice. The example computer (852) of FIG. 8 includes a video adapter (809), which is an example of an I/O adapter specially designed for graphic output to a display device (880) such as a display screen or computer monitor. Video adapter (809) is connected to processor (856) through a high speed video bus (864), bus adapter (858), and the front side bus (862), which is also a high speed bus.

The example computer (852) of FIG. 8 includes a communications adapter (867) for data communications with other computers and for data communications with a data communications network (800). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for managing virtual machine patterns according to embodiments of the present invention include modems for wired dial-up communications, Ethernet (IEEE 802.3) adapters for wired data communications network communications, and 802.11 adapters for wireless data communications network communications.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of managing virtual machine patterns, the method comprising:
configuring a first virtual machine pattern using existing deployment rules, wherein the first virtual machine pattern is a configuration of virtual entities comprising virtual machines, virtual storage, and virtual local area networks managed as a single entity;
for the first virtual machine pattern, identifying resource utilization of each virtual machine having a first group of resources including identifying two or more applications executing on one or more virtual machines within the first virtual machine pattern that utilize duplicate resources;
determining resource requirements of at least two applications executing on one or more virtual machines within the first virtual machine pattern;
based on the resource utilization and the determined resource requirements, identifying virtual machines of a second virtual machine pattern for executing the at least two applications that satisfies the resource requirements of the at least two applications, wherein the virtual machines of the second virtual machine pattern use a second group of resources that is a consolidation of the first group of resources of the first virtual machine pattern with no duplicate resources;
deploying the at least two applications from the first virtual machine pattern to the identified virtual machines of the second virtual machine pattern; and
updating the deployment rules for deploying the at least two applications after deploying the at least two applications onto the identified virtual machines of the second virtual machine pattern, such that the at least two applications are subsequently launched in the future on the second virtual machine pattern based on the updated deployment rules.

2. The method of claim 1 wherein:
for the first virtual machine pattern, identifying resource utilization of each virtual machine further comprises identifying two or more applications executing on one or more virtual machines within the first virtual machine pattern that compete for resources; and wherein
deploying the at least one of the at least two applications from the first virtual machine pattern to the identified virtual machines of the second virtual machine pattern further comprises deploying the two or more applications onto one or more virtual machines of the second virtual machine pattern such that the two or more applications no longer compete for resources.

3. The method of claim 1 wherein:
for the first virtual machine pattern, identifying resource utilization of each virtual machine further comprises identifying two or more applications executing on one or more virtual machines within the first virtual machine pattern that generate an amount of intra-application network traffic above a predetermined threshold; and wherein
deploying the at least one of the at least two applications from the first virtual machine pattern to the identified virtual machines of the second virtual machine pattern further comprises deploying the two or more applications onto one virtual machine of the second virtual machine pattern such that the two or more applications no longer generate intra-application network traffic above a predetermined threshold.

4. The method of claim 1 wherein deploying the at least two applications from the first virtual machine pattern to the identified virtual machines of the second virtual machine pattern further comprises:
identifying data communications links utilized by the one of the at least two applications in the first virtual machine pattern; and
replicating the data communications links utilized by the one of the at least two applications in the second virtual machine pattern, wherein replicating the data communications links comprises generating a data communications link of a second link type in the second virtual machine pattern.

5. The method of claim 4 wherein:
identifying data communications links utilized by the one of the at least two applications in the first virtual machine pattern further comprises identifying a first link type for the data communications links utilized by the one of the at least two applications in the first virtual machine pattern; and
replicating the data communications links utilized by the one of the at least two applications in the second virtual machine pattern further comprises generating a data communications link of a second link type in the second virtual machine pattern.

6. The method of claim 4 wherein identifying data communications links utilized by the one of the at least two applications in the first virtual machine pattern further comprises inspecting metadata associated with each virtual machine that the at least two applications are executing on.

7. The method of claim 1 wherein deploying the at least two applications from the first virtual machine pattern to the identified virtual machines of the second virtual machine pattern includes calculating the lowest number of CPUs that must be available to a virtual machine such that the determined resource requirements for the at least two applications is met and the resource utilization is greater than a predetermined threshold.

8. An apparatus for managing virtual machine patterns, the apparatus comprising a computer processor, a computer memory operatively coupled to the computer processor, the computer memory having disposed within it computer program instructions that, when executed by the computer processor, cause the apparatus to carry out the steps of:
configuring a first virtual machine pattern using existing deployment rules, wherein the first virtual machine pattern is a configuration of virtual entities comprising virtual machines, virtual storage, and virtual local area networks managed as a single entity;
for the first virtual machine pattern, identifying resource utilization of each virtual machine having a first group of resources including identifying two or more applications executing on one or more virtual machines within the first virtual machine pattern that utilize duplicate resources;

determining resource requirements of at least two applications executing on one or more virtual machines within the first virtual machine pattern;

based on the resource utilization and the determined resource requirements, identifying virtual machines of a second virtual machine pattern for executing the at least two applications that satisfies the resource requirements of the at least two applications, wherein the virtual machines of the second virtual machine pattern use a second group of resources that is a consolidation of the first group of resources of the first virtual machine pattern with no duplicate resources;

deploying the at least two applications from the first virtual machine pattern to the identified virtual machines of the second virtual machine pattern; and updating deployment rules for deploying the at least two applications after deploying the at least two applications onto the one or more identified virtual machines of the second virtual machine pattern, such that the at least two applications are subsequently launched in the future on the second virtual machine pattern based on the updated deployment rules.

9. The apparatus of claim 8 wherein:

for the first virtual machine pattern, identifying resource utilization of each virtual machine further comprises identifying two or more applications executing on one or more virtual machines within the first virtual machine pattern that compete for resources; and wherein deploying the at least one of the at least two applications from the first virtual machine pattern to the identified virtual machines of the second virtual machine pattern further comprises deploying the two or more applications onto one or more virtual machines of the second virtual machine pattern such that the two or more applications no longer compete for resources.

10. The apparatus of claim 8 wherein:

for the first virtual machine pattern, identifying resource utilization of each virtual machine further comprises identifying two or more applications executing on one or more virtual machines within the first virtual machine pattern that generate an amount of intra-application network traffic above a predetermined threshold; and wherein deploying the at least one of the at least two applications from the first virtual machine pattern to the identified virtual machines of the second virtual machine pattern further comprises deploying the two or more applications onto one virtual machine of the second virtual machine pattern such that the two or more applications no longer generate intra-application network traffic above a predetermined threshold.

11. The apparatus of claim 8 wherein deploying the at least two applications from the first virtual machine pattern to the identified virtual machines of the second virtual machine pattern further comprises:

identifying data communications links utilized by the one of the at least two applications in the first virtual machine pattern; and replicating the data communications links utilized by the one of the at least two applications in the second virtual machine pattern, wherein replicating the data communications links comprises generating a data communications link of a second link type in the second virtual machine pattern.

12. The apparatus of claim 11 wherein:

identifying data communications links utilized by the one of the at least two applications in the first virtual machine pattern further comprises identifying a first link type for the data communications links utilized by the one of the at least two applications in the first virtual machine pattern; and replicating the data communications links utilized by the one of the at least two applications in the second virtual machine pattern further comprises generating a data communications link of a second link type in the second virtual machine pattern.

13. A computer program product for managing virtual machine patterns, the computer program product disposed upon a non-transitory computer readable medium, the computer program product comprising computer program instructions that, when executed, cause a computer to carry out the steps of:

configuring a first virtual machine pattern using existing deployment rules, wherein the first virtual machine pattern is a configuration of virtual entities comprising virtual machines, virtual storage, and virtual local area networks managed as a single entity;

for the first virtual machine pattern, identifying resource utilization of each virtual machine having a first group of resources including identifying two or more applications executing on one or more virtual machines within the first virtual machine pattern that utilize duplicate resources;

determining resource requirements of at least two applications executing on one or more virtual machines within the first virtual machine pattern;

based on the resource utilization and the determined resource requirements, identifying virtual machines of a second virtual machine pattern for executing the at least two applications that satisfies the resource requirements of the at least two applications, wherein the virtual machines of the second virtual machine pattern use a second group of resources that is a consolidation of the first group of resources of the first virtual machine pattern with no duplicate resources;

deploying the at least two applications from the first virtual machine pattern to the identified virtual machines of the second virtual machine pattern; and updating the deployment rules for deploying the at least two applications after deploying the at least two applications onto the identified virtual machines of the second virtual machine pattern, such that the at least two applications are subsequently launched in the future on the second virtual machine pattern based on the updated deployment rules.

14. The computer program product of claim 13 wherein:

for the first virtual machine pattern, identifying resource utilization of each virtual machine further comprises identifying two or more applications executing on one or more virtual machines within the first virtual machine pattern that compete for resources; and wherein deploying the at least one of the at least two applications from the first virtual machine pattern to the identified virtual machines of the second virtual machine pattern further comprises deploying the two or more applications onto one or more virtual machines of the second virtual machine pattern such that the two or more applications no longer compete for resources.

15. The computer program product of claim 13 wherein:

for the first virtual machine pattern, identifying resource utilization of each virtual machine further comprises identifying two or more applications executing on one or more virtual machines within the first virtual machine pattern that generate an amount of intra-application network traffic above a predetermined threshold; and wherein deploying the at least one of the at least two applications from the first virtual machine pattern to the identified virtual machines of the second virtual machine pattern further comprises deploying the two or more applications onto one virtual machine of the second virtual machine pattern such that the two or more applications no longer generate intra-application network traffic above a predetermined threshold.

16. The computer program product of claim 13 wherein deploying the at least two applications from the first virtual machine pattern to the identified virtual machines of the second virtual machine pattern further comprises:

identifying data communications links utilized by the one of the at least two applications in the first virtual machine pattern; and replicating the data communications links utilized by the one of the at least two applications in the second virtual machine pattern, wherein replicating the data communications links comprises generating a data communications link of a second link type in the second virtual machine pattern.

17. The computer program product of claim 16 wherein:

identifying data communications links utilized by the one of the at least two applications in the first virtual machine pattern further comprises identifying a first link type for the data communications links utilized by the one of the at least two applications in the first virtual machine pattern; and replicating the data communications links utilized by the one of the at least two applications in the second virtual machine pattern further comprises generating a data communications link of a second link type in the second virtual machine pattern.

* * * * *